United States Patent [19]

Engelleitner

[11] 4,207,050
[45] Jun. 10, 1980

[54] MULTIPLE DEPTH PELLETIZER

[75] Inventor: William H. Engelleitner, Coraopolis, Pa.

[73] Assignee: Mars Mineral Corporation, Valencia, Pa.

[21] Appl. No.: 939,842

[22] Filed: Sep. 5, 1978

[51] Int. Cl.² ............................ B01J 2/24; B01J 2/12
[52] U.S. Cl. .................................... 425/183; 425/186; 425/222
[58] Field of Search .................... 425/222, 183, 186

[56] References Cited

U.S. PATENT DOCUMENTS

| | | | |
|---|---|---|---|
| 3,010,145 | 11/1961 | Rolfsen | 425/222 |
| 3,206,528 | 9/1965 | Coombs et al. | 425/222 |
| 3,802,822 | 4/1974 | Harbison | 425/222 |

*Primary Examiner*—Donald J. Arnold
*Assistant Examiner*—James R. Hall
*Attorney, Agent, or Firm*—Webb, Burden, Robinson & Webb

[57] ABSTRACT

Apparatus for pelletizing particulate materials in a pelletizing bed comprising, a drum having opened and closed ends and a cylindrical or conical wall therebetween. The wall is comprised of annular sections which are releasably secured together.

5 Claims, 3 Drawing Figures

MULTIPLE DEPTH PELLETIZER

BACKGROUND OF THE INVENTION

There exists in the pelletizing art three types of pelletizing devices each designed to provide a somewhat different pellet size and size distribution. Each has its relative advantages considering the type of material being pelletized. More specifically, there exist shallow pan or disc type pelletizers, deep pan pelletizers and deep drum pelletizers. For example, a shallow disc pelletizer might have a depth to diameter ratio of 0.1 to 0.3, a deep pan pelletizer a depth to diameter ratio of 0.3 to 0.5 and a deep drum pelletizer a depth to diameter ratio of 0.5 to 0.7. It is generally desirable to be able to experiment with varying types of pelletizers in the laboratory before moving to a large production device. In this way, the most suitable pelletizer for a given application may be determined on a small scale.

It is an advantage according to this invention to provide a pelletizer having an adjustable depth to diameter ratio.

SUMMARY OF THE INVENTION

Briefly, according to this invention there is provided a mutliple depth pelletizing device which is particularly useful in the laboratory. It comprises a cylindrical walled vessel mounted on a driven shaft. The shaft is coaxial with the circular cylindrical axis. Alternatively, the vessel may have a conical sidewall in which case the conical axis is coaxial with the shaft and the axis of rotation. In other words, the walls of the vessel generally comprise a surface of revolution, i.e., a surface which is the focus of a line that revolves about a fixed axis. The shaft is journaled to a bracket that allows the shaft and vessel to be inclined at various angles to the horizon, say zero degrees (in which case the vessel axis is horizontal) to say 60 degrees. The speed of rotation must be variable up to at least 40 rpm. The unusual feature of the applicant's pelletizer is that the wall comprises a plurality of annular sections which are releasably secured together. Preferably, the annular sections have substantially equal depth along the rotating axis of the vessel and the ratio of this depth to the diameter of the vessel at the closed end is between about 0.1 to 0.3 and typically 0.2. With no annular section secured in place, a shallow disc pelletizer is provided. With one disc in place, a deep pan pelletizer is provided. With three or more sections in place, a deep drum pelletizer is provided. It is also possible to provide the last annular extension to be added to the vessel i.e., the farthest from the closed end of the vessel, with an inwardly extending lip to thus maintain the depth of the pelletizing bed when the axis of rotation is horizontal.

DESCRIPTION OF THE PREFERRED EMBODIMENTS

Figure 1:
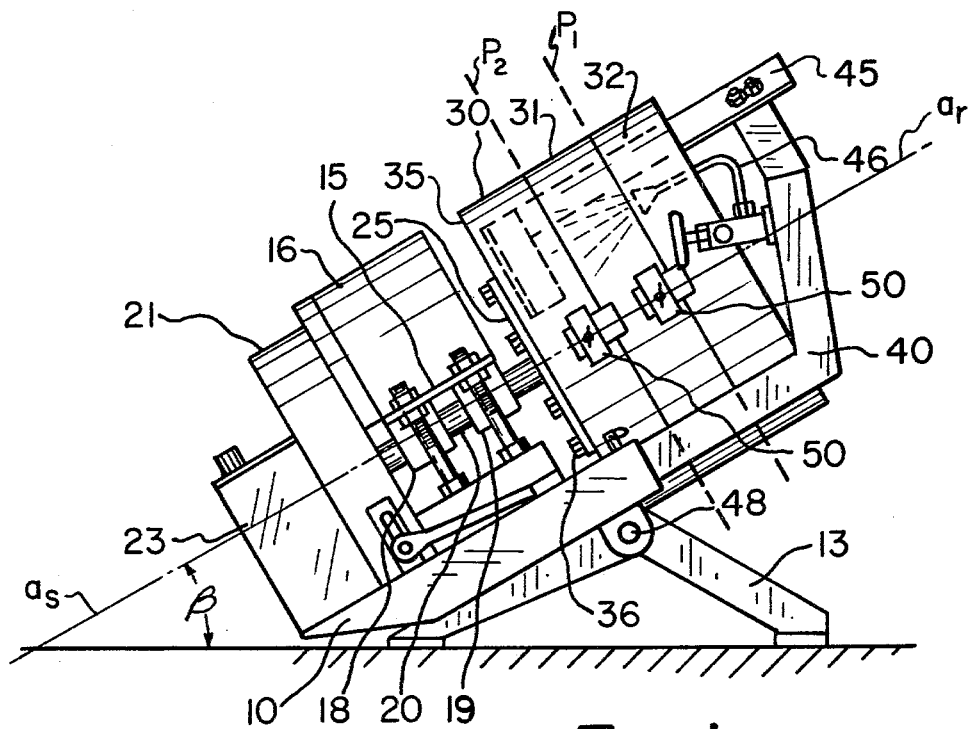
Figure 2:
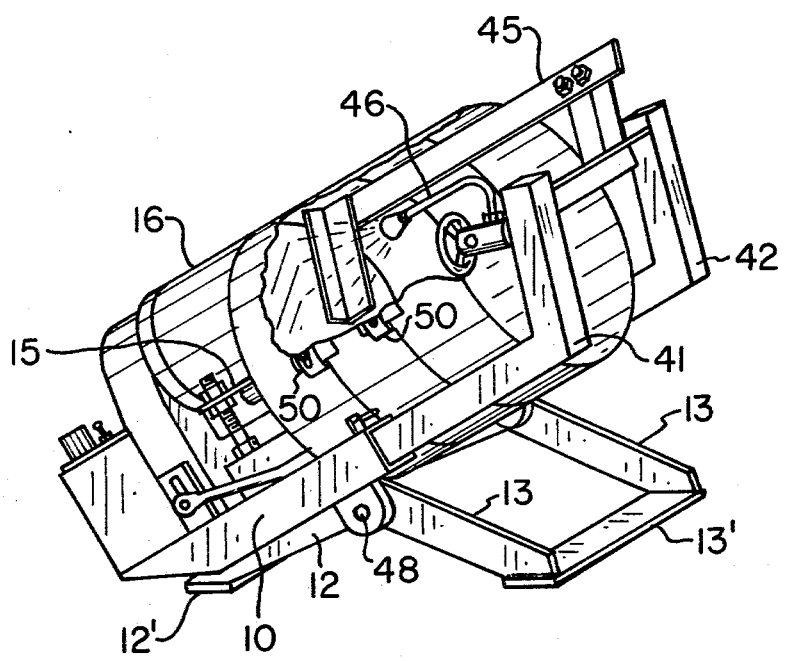
Figure 3:
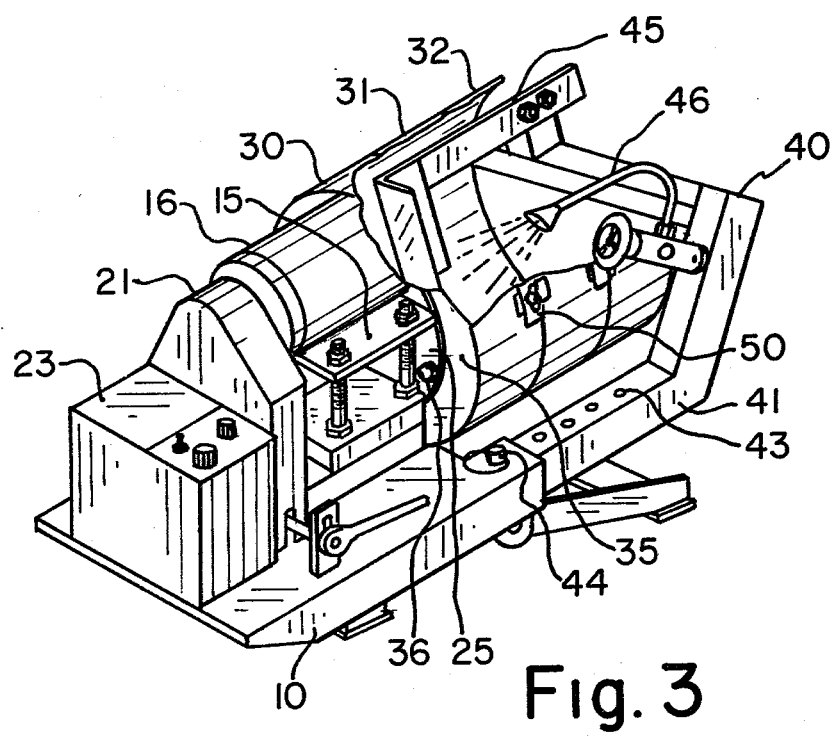

Further features and other objects and advantages of this invention will become apparent from the following detailed description made with reference to the drawings in which FIG. 1 is a side view of the multiple depth pelletizer according to this invention, FIG. 2 is a cut away front-side perspective of the device of FIG. 1, and FIG. 3 is a cut away rear-side perspective of the device of FIG. 1.

Referring now to the figures, there is shown a pelletizer comprising a platform 10 pivotally supported by two leg pairs 12 and 13. Supported above the platform 10 is a table 15. The table is supported above the platform by at least four elongate bolts that are secured at one end of the platform and at the other end to the table. The table is sandwiched between nuts threaded on the bolts thereby enabling the distance between the table and the platform to be adjusted and fixed.

A motor 16 is mounted on the top of the table 15. It may be an electric motor or a compressed air motor depending upon the particular source of energy available to the user.

Bearings 18 and 19 are secured to the bottom of the table and shaft 20 is journaled therein. The bearings must not only rotatably secure the shaft but must also restrain its movement in the axial direction. Sheaves or sprockets secured to the output shaft of the motor and on the end of shaft 20 are joined by belts or chains in a suitable manner to transfer torque from the motor to the shaft. The sheaves or sprockets are surrounded by an appropriate shaped safety shield 21. Motor speed controls are mounted in a cabinet 23 at the back end of the pelletizer for convenience.

The shaft 20 has a radial flange 25 secured to the end opposite the sheave or sprocket. The pelletizing vessel comprises sections 30, 31 and 32 having cylindrical side walls and in the case of section 30 a closed end 35. The sections 30, 31 and 32 abut on planes $P_1$, $P_2$ parallel to the closed end 35. The radial flange 25 is secured to the closed end 35 of the vessel section 30 by suitable fasteners. The flange is positioned to align the axis of the shaft $a_s$ with the cylindrical axis of the vessel $a_r$.

The closed end section 30 and the two annular sections 31 and 32 of the vessel are preferably lap jointed at ajoining circular edges and releasably fastened together by fasteners 50 drawing the sections toward one another in the axial direction. As shown in the drawing, the fastener may comprise a clamp which engages a tab extending outwardly from one section. The clamp is secured by a wing nut to the adjacent section.

An adjustable scraper frame 40 has two extensions 41 and 42 that slide into openings in the platform 10. The extensions have a plurality of pin receiving openings 43 therein along the length thereof. In this way by insertion of a pin 44 through an opening in the platform and then into one of the openings 43 in the scraper frame, the spacing of the frame from the platform can be adjusted and secured. Mounted to the scraper frame is a scraper or plow 45 which limits the build-up of agglomerating materials upon the closed end and cylindrical inside walls of the vessel. A liquid spray head 46 is also mounted to the scraper frame 40. It is convenient if the spray head and adjoining conduit is connected to an adjustable valve mounted to the scraper frame 40 so that the intensity of the liquid spray can be adjusted while observing the pelletizing process.

The leg pairs 12 and 13 are pivotally mounted to the platform 10 at 48. The leg pairs each have associated therewith pads 12' and 13' joining the respective legs thereof. The angle between the leg pairs 12 and 13 may be adjusted and fixed in the range of 180 degrees to less than 90 degrees. Whatever the angle which is fixed between the leg pairs, the platform 10 may be rotated about the axis 48. The weight distribution of the parts mounted on the platform will cause the platform to normally rest upon leg pair 12 such that the open end of the vessel is pointed outwardly and upwardly. However, it is possible to tip the vessel while it is still rotating so that the scraper frame 40 lies along leg pair 13 thus enabling the vessel to be emptied while rotating. The angle β of the axis of the vessel with respect to the horizon for normal operation is adjusted by adjusting the angle between the leg pairs.

The vessel described above and depicted in the figures has actually been constructed. The vessel had circular cylindrical sidewalls of a diameter of fourteen inches. Each section of the vessel was three inches deep. The vessel was made of stainless steel suitable for handling food and pharmaceutical materials as well as minerals and chemicals.

OPERATION

When an experimenter desires to ascertain the most appropriate pelletizing conditions for a particular material and for the production of a particular size pellet and size distribution of pellets, the above described apparatus is particularly suitable. The experimenter will desire to vary at least the parameters including the vessel depth, the angle of the axis of the vessel with respect to the horizon, the speed of rotation of the vessel, and the speed rates of material to be pelletized and the intensity of the spray. All of these factors can very conveniently be manipulated by the use of the applicant's apparatus without the need for laborious modifications of the apparatus. When the vessel has sections 31 and 32 attached and it is desired to use only the closed end section 30, pens 44 may be withdrawn from holes 43 so that the scraper frame 40 may be moved outwardly from the platform 10. Then the fasteners 50 may easily be released to enable the separation of section 31 from section 30. Thereafter, the scraper frame is returned to its position with the plow resting against the closed end of section 30.

Having thus defined my invention with the detail and particularity required by the Patent Laws, what is desired protected by Letters Patent is set forth in the following claims.

I claim:

1. An apparatus for pelletizing particulate materials in a pelletizing bed comprising in combination
   a base angularly adjustable with respect to the horizon,
   a pelletizing drum having an opened end and a closed end and a sidewall, said closed end secured to a shaft journaled to said base, said closed end being planar and perpendicular to the axis of said shaft, said sidewall comprising a surface of revolution having an axis coaxial with the axis of the shaft defining the rotating axis of the vessel, said sidewall being comprised of at least two separable sections which sections abut on a plane parallel to the closed end, and
   means for releasably securing the sidewall sections together.

2. An apparatus according to claim 1 wherein the sidewall comprises at least three sections.

3. An apparatus according to claim 2 wherein the sections have substantially equal depth along the rotating axis and the ratio of the depth of the sections to the diameter of the vessel at the closed end is between 0.1 and 0.3.

4. An apparatus according to claims 1, 2 or 3 wherein a scraper frame and scraper are adjustably secured to the base.

5. An apparatus according to claim 1 wherein the section of the sidewall farthest from the closed end has an inwardly extending lip.

* * * * *